Figure 1:
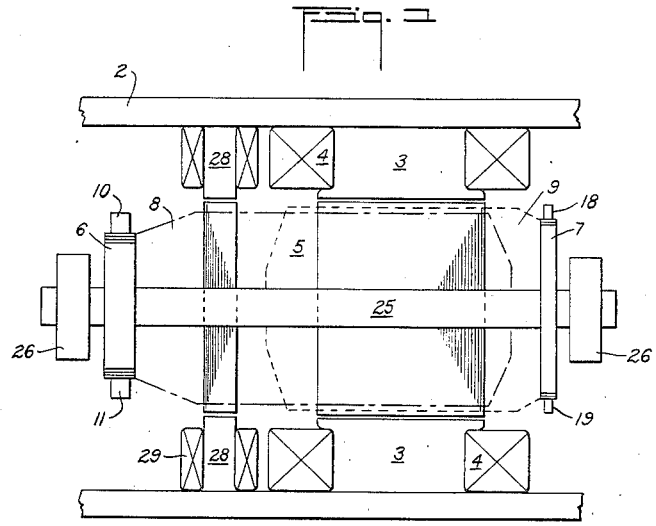

Oct. 22, 1935.　　　　J. W. ALLEN　　　　2,018,107

ELECTRICAL APPARATUS

Filed March 25, 1933

INVENTOR.
Joseph W. Allen
BY Martin J. Finnegan
ATTORNEY.

Patented Oct. 22, 1935

2,018,107

UNITED STATES PATENT OFFICE 2,018,107

ELECTRICAL APPARATUS

Joseph W. Allen, East Orange, N. J., assignor, by mesne assignments, to Eclipse Aviation Corporation, East Orange, N. J., a corporation of New Jersey Application March 25, 1933, Serial No. 662,805

12 Claims. (Cl. 171—223)

This invention relates to dynamo electric machines, and more particularly to machines having a plurality of field coil structures, each having a distinct winding.

One of the objects of the present invention is to provide a novel dynamo electric machine of the dynamotor or motor-generator type, capable of maintaining a substantially constant potential across the output terminals, even though the current input is subject to voltage variations.

Another object of the invention is to provide a dynamo electric machine having a plurality of windings for the receipt and delivery of current respectively, in which at least one of the windings is subject to the influence of an auxiliary field of automatically variable strength, so that it functions to "boost" the voltage across one portion of said winding when the voltage across one or more of the other portions thereof drops, and also functions to lower the voltage across said first portion when the voltage across one or more of the other portions is raised, the net result being the maintenance of a substantially constant voltage output notwithstanding variations in the voltage supplied to the current receiving terminals of the machine.

In the preferred embodiment of the invention as disclosed herein, the machine is shown as a dynamotor having two armature and two field windings, one being the main winding and one the auxiliary in each case, and one of the armature windings being connected with a commutator adapted to receive electrical energy from an external source, such as a battery or separate generator; but it is to be understood that the invention is also applicable to electrical apparatus in which there are more than two armature and/or field windings, or in which the current receiving section of the apparatus is in the form of a separate motor mechanically connected to the remainder of the apparatus to constitute a motor-generator set.

In order to obtain the automatic regulation of the voltage output of the machine, I provide a series of resistance elements interconnected with the field coil windings in such a manner that the whole arrangement constitutes in effect a Wheatstone bridge, with the auxiliary field winding occupying the relative position usually occupied by a galvanometer, and with the winding constituting the main field coil structure, divided so that one-half said winding constitutes one arm or link of the bridge, and the other half constitutes an oppositely disposed link. For the remaining links of the bridge I prefer to employ ballast resistors for the reason that such devices are characterized by a tendency to maintain a substantially constant current under variations in voltage, at least within a definite range suitable for the purpose; but it is to be understood that any other resistance elements capable of performing in an equivalent manner may be substituted for such ballast devices.

Although not confined to such a use (as above pointed out) the invention finds an important field of utility as a dynamotor unit operated from a separate source of electrical energy, as for example, a generator-storage battery combination. In such an installation the present invention provides means whereby a constant voltage output is maintained throughout the entire cycle, beginning with the period when the voltage input is a minimum, as for example when the battery is not being charged by the generator, and continuing through the period while the generator is charging the battery, at which time the voltage input is a maximum. Such a system is indicated in the accompanying drawing constituting a diagrammatic illustration of the invention, although not designed as a definition of the limits thereof.

Figure 2:
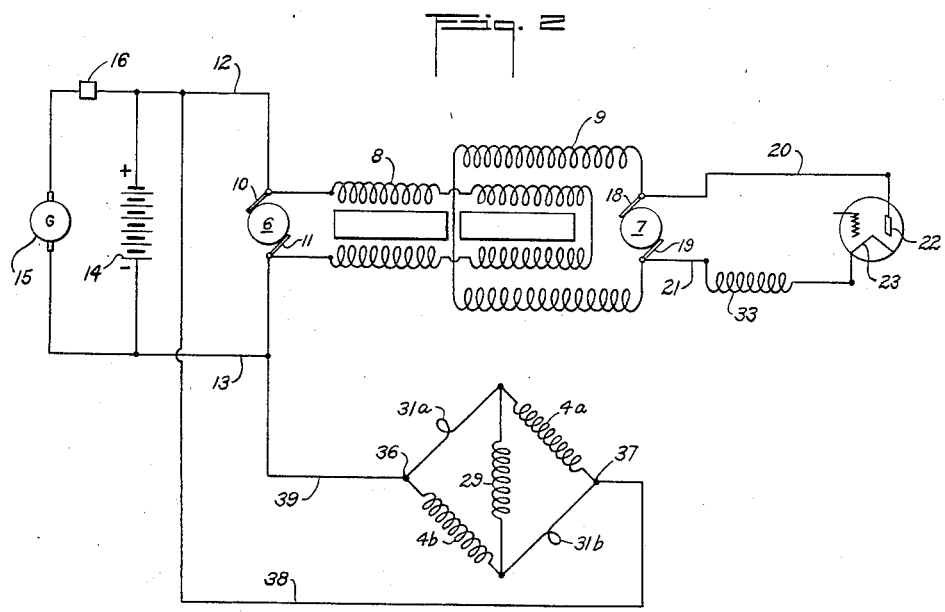

In the drawing, Fig. 1 is a diagrammatic view showing the physical relationship of certain of the parts entering into the preferred embodiment of the invention; and Fig. 2 is a schematic illustration of the electrical circuits and parts constituting the complete apparatus.

Referring to the drawing, reference character 2 represents the frame of a machine upon which are mounted main field pole pieces 3 disposed in the conventional manner on the interior of the frame. Coils 4 of the proper number of turns are so wound on the pole pieces 3 as to provide the conventional north and south poles. Within and extending through pole pieces 3 is a rotor 5 having a commutator 6 at one end and a commutator 7 at the other. A current receiving armature winding 8 of the proper number of turns is wound in slots on rotor 5 and the ends of the winding are connected with the commutator 6. A second, and preferably higher voltage armature winding 9 is also wound on the rotor 5, and may occupy the same slots as those of the winding 8 or adjacent slots. The ends of the winding 9 are connected with the commutator 7, and the turns of the winding 9 extend only to the limit of the range of the main field flux created by the coils 4; while the current receiving winding 8 on the other hand extends beyond the range of the main field flux and within an auxiliary field as hereinafter described.

Brushes 10 and 11 are provided for distributing the current fed to the receiving winding 8, and by means of leads 12 and 13 are connected with a battery 14 and a generator 15 which charges said battery through connections which preferably include a conventional reverse current cutout 16. Brushes 18 and 19 are provided for collecting current from the commutator 7 and supplying the same by means of leads 20 and 21 to a constant current consuming device, such as a plate 22, adapted to receive an electronic charge from the filament 23 of a radio tube.

The armature shaft 25, which locked to the armature rotor 5 in any well known manner, forming no part of the present invention, is preferably mounted in bearings 26 representing part of the frame assembly 2.

As above suggested, the present invention provides means additional to the main field winding 4, and electrically connected thereto in a novel manner for automatically varying the inductive effect upon the current flowing through the machine in accordance with variations in the voltage across the input terminals 10 and 11. As shown, such means includes pole pieces 28 mounted on the interior frame 2 in angular positions corresponding to the positions of the main pole pieces 3, but axially spaced with respect thereto as indicated in Fig. 1. On the pole pieces 28 are wound a coil or coils 29 having the desired number of turns. As shown in Fig. 1, the axial spacing of the auxiliary pole pieces 28 is such that they coact magnetically with the left hand portion only of the conductors constituting the current receiving winding 8, but have no electromagnetic effect upon any portion of the current delivering winding 9, as the turns of the latter winding terminate short of the inductive range of this auxiliary field. It is evident, therefore, that the electro-motive effect developed in the left hand sections of the current receiving winding 8 will either assist or oppose the E. M. F. developed in the right hand portions thereof (subjected to the influence of the main field 3) depending upon whether the direction of flow in the auxiliary windings 29 is the same or opposite to the direction of flow in the windings 4 of the main field. It is also evident that it is desirable to have the E. M. F. developed in the left hand portions of the windings assist that developed in the right hand portions on any occasion when the input voltage drops below the mean voltage input, as for example, during the period when the generator 15 is not working and the battery 14 is discharging. It will also be evident that it is desirable to reverse this condition automatically as soon as the generator charges the battery 14 sufficiently to produce a resultant rise in the voltage across the input terminals 10 and 11. I effect this automatic change in the value and direction of the E. M. F. in the windings 29 by dividing the main field pole windings 4 into equal sections 4a and 4b, as shown schematically in Fig. 2, and electrically connecting said sections with winding 29 and a pair of resistance elements 31a and 31b in such a manner that the latter form two opposite arms or links of a Wheatstone bridge while the windings 4a and 4b constitute the other arms or links thereof, with the auxiliary winding 29 constituting the central link and taking the position usually occupied by a galvanometer in the conventional Wheatstone hook-up; the remaining terminals 36 and 37 being connected to leads 12 and 13 respectively, as shown at 38 and 39.

As above suggested, the resistance elements 31a and 31b are preferably similar to the ballast resistors now commonly used in electrical circuits, and characterized by a tendency to maintain a substantially constant current under variations in voltage, at least within a definite range, depending upon the physical and electrical characteristics of the unit.

With the electrical parts arranged as above indicated it is apparent that the current through the windings 4a, 4b and 29 will be proportional to the voltage or E. M. F. impressed thereupon, just as is the case with the resistance elements correspondingly arranged in the conventional Wheatstone bridge. It will also be evident that the voltage across the resistance elements 31a and 31b will vary in direct proportion to the variation in the voltage across the input terminals 10 and 11 of the machine in such a manner that at comparatively low input voltage, the voltage drop across resistance elements 31a and 31b will be less than that across the windings 4a and 4b, while at higher input voltages, the voltage drop across the resistance elements 31a and 31b will be greater than that across the windings 4a and 4b. Consequently the voltage across the winding 29 and the current flowing therethrough will change from a maximum in one direction (when for example, the input voltage is a minimum) through a minimum or neutral point to a maximum in the opposite direction, when for example the input voltage is a maximum, this change in amount and direction of current through the auxiliary field 29 being obtained automatically in accordance with variations in voltage across the input terminals 10 and 11.

Now inasmuch as the E. M. F. impressed upon the current being generated in the rotor winding 9 and fed to the current delivery terminals 18 and 19 of the commutator 7, is a direct function of, and corresponds to, the resultant E. M. F. (that is, the input E. M. F. increased or diminished by the compensating effect of the field 29) existing in the rotor windings 8, it follows that the compensating effect of the auxiliary field windings 29 tends to stabilize the E. M. F. not only in the input windings 8, but also in the output windings 9.

As a further refinement upon the stabilizing effect of the windings 29, the pole pieces 28 may include, if desired, an additional compensating field electrically connected in the manner indicated at 33 in Fig. 2. When so disposed it will be apparent that this additional compensating field 33 is in the nature of a series field in its relation to the output winding 9, and therefore the flux produced by this series field 33 will be proportional to the current taken from the output terminals 18 and 19. Now inasmuch as an increase of current taken from the terminals 18 and 19 causes a corresponding increase in the current flow through the input winding 8, it follows that a voltage drop will occur in both these windings in response to such an increase in current, and that portion of this change in potential which occurs in the left hand portion of the windings 8 will act to compensate for the drop in voltage caused by the current increase above described.

It will be obvious that the invention is not limited to the specific form described and illustrated in the drawing, but is capable of a variety of electro-mechanical embodiments. Various changes which will now appear to those skilled in the art may be made in the form, details of construction, and arrangement of the parts, without departing from the spirit of the invention, as expressed in the broadest of the appended claims.

What is claimed is:

1. In a dynamo electric machine having a main field winding and an auxiliary field winding each constituting a distinct magnetic circuit, means for electrically connecting said windings so that one winding is divided to form two links of a multi-lateral network and the other winding constitutes an additional link in series with the first, and means for varying the amount and direction of current flow in the second named winding, said means constituting another part of said network.

2. In combination with a dynamo electric machine having a main field winding and an auxiliary field winding each constituting a distinct magnetic circuit, means for electrically connecting said windings so that one winding is divided to form two links of a multi-lateral network and the other winding constitutes an additional link in series with the first, and means for varying the amount and direction of current flow in said second named winding, said means comprising resistance elements acting to subject said second-named winding to voltage variations proportional to the voltage variations occurring in said first named winding.

3. In combination with a dynamo electric machine having a main field winding and an auxiliary field winding, means for electrically connecting said windings so that one is divided into two sections and the other forms a series couple between said sections, and means for varying the amount and direction of current flow in said second named winding, said means comprising ballast resistance elements acting to subject said second named winding to voltage variations proportional to the voltage variations occurring in said first named winding.

4. In combination with a dynamo electric machine having a main field winding and an auxiliary field winding, means for electrically connecting said windings so that one is divided into two sections, means for varying the amount and direction of current flow in said second named winding, said means comprising ballast resistance elements acting to subject said second named winding to voltage variations proportional to the voltage variations occurring in said first named winding, and means constituted by said second named winding for electrically coupling said ballast resistance elements.

5. In combination with a dynamo electric machine having a current receiving armature winding and a current generating armature winding, a plurality of sets of field pole pieces within the induction range of said current receiving armature winding, a corresponding plurality of field windings, one for each of said sets of field pole pieces, means for electrically connecting said winding so that one is divided to form two opposite links of a Wheatstone bridge, and the other constitutes a central link in series with the first, and means for varying the amount and direction of current flow in the second named field winding, said means comprising ballast resistance elements acting to subject said second named field winding to voltage variations proportional to the voltage variations occurring in said first named field winding.

6. In combination with a dynamo electric machine having a plurality of sets of field pole pieces with each set of pole-pieces constituting a separate magnetic circuit and a corresponding plurality of field windings, means for electrically connecting said windings so that one field winding is divided to form two opposite links of a Wheatstone bridge and the other field winding constitutes a central link through which the direction of current flow reverses when the bridge ratio reverses.

7. In combination with a dynamo electric machine having a plurality of sets of field pole pieces with each set of pole pieces constituting a separate magnetic circuit and a corresponding plurality of field windings, means for electrically connecting said windings so that one field winding is divided to form two opposite links of a Wheatstone bridge and the other field winding constitutes a central link in series with the first, and means for varying the amount and direction of current flow in the second named field winding, said means constituting the other two links of the bridge.

8. In combination with a dynamo electric machine having a plurality of sets of field pole pieces and a corresponding plurality of field windings, means for electrically connecting said windings so that one field winding is divided to form two opposite links of a Wheatstone bridge and the other field winding constitutes a central link in series with the first, and means for varying the amount and direction of current flow in said second named field winding, said means comprising ballast resistance elements acting to subject said second named field winding to voltage variations proportional to the voltage variations occurring in said first named field winding.

9. In combination with a dynamo electric machine having a plurality of sets of field pole pieces and a corresponding plurality of field windings, means for electrically connecting said windings so that one is divided into two sections and the other forms a series couple between said sections, and means for varying the amount and direction of current flow in said second named field winding, said means comprising ballast resistance elements acting to subject said second named field winding to voltage variations proportional to the voltage variations occurring in said first named field winding.

10. In combination with a dynamo electric machine having a plurality of sets of field pole pieces and a corresponding plurality of field windings, means for electrically connecting said windings so that one is divided into two sections, means for varying the amount and direction of current flow in said second named field winding, said means comprising ballast resistance elements acting to subject said second named field winding to voltage variations proportional to the voltage variations occurring in said first named field winding, and means constituted by said second named field winding for electrically coupling said ballast resistance elements.

11. In combination with a dynamo electric machine having a current receiving armature winding and a current generating armature winding, a plurality of sets of field pole pieces constituting a corresponding plurality of separate magnetic circuits and located within the induction range of said current receiving armature winding, a corresponding plurality of field windings, one for each of said sets of field pole pieces, and means for electrically connecting said winding so that one is divided to form two opposite links of a Wheatstone bridge, and the other constitutes a central link in series with the first, and means in the other two links of the bridge for varying the amount and direction of current flow in the second field winding, whereby the current generated in the second named armature winding is maintained at substantially constant potential regardless of variations in voltage across said first named armature winding.

12. In combination with a dynamo electric machine having a current receiving armature winding and a current generating armature winding, a plurality of sets of field pole pieces within the induction range of said current receiving armature winding, a corresponding plurality of field windings, one for each of said sets of field pole pieces, means for electrically connecting said winding so that one is divided to form two opposite links of a Wheatstone bridge, and the other constitutes a central link in series with the first, means for varying the amount and direction of curent flow in said second named field winding, said means comprising ballast resistance elements subject to voltage variations proportional to the voltage variations occurring in said first named field winding, whereby the current generated in the second named armature winding is maintained at substantially constant potential regardless of variations in voltage across said first named armature winding.

JOSEPH W. ALLEN.